(No Model.) 2 Sheets—Sheet 1.

J. G. SMITH.
CREAMER.

No. 447,914. Patented Mar. 10, 1891.

WITNESSES:
C. C. Schiller, Jr.
Harry L. Amer.

INVENTOR
Julius G. Smith
BY
E. E. Masson
ATTORNEY (No Model.) 2 Sheets—Sheet 2.

J. G. SMITH.
CREAMER.

No. 447,914. Patented Mar. 10, 1891.

WITNESSES:
C. C. Schiller, Jr.
Harry L. Amer.

INVENTOR
Julius G. Smith
BY
E. E. Masson
ATTORNEY

UNITED STATES PATENT OFFICE.

JULIUS G. SMITH, OF MARGARETVILLE, NEW YORK, ASSIGNOR OF ONE-HALF TO CHARLES J. DICKSON, OF SAME PLACE.

CREAMER.

SPECIFICATION forming part of Letters Patent No. 447,914, dated March 10, 1891.

Application filed December 27, 1889. Serial No. 335,122. (No model.)

*To all whom it may concern:*

Be it known that I, JULIUS G. SMITH, a citizen of the United States, residing at Margaretville, in the county of Delaware, State of New York, have invented certain new and useful Improvements in Creamers, of which the following is a specification, reference being had therein to the accompanying drawings.

My invention relates to apparatus for cooling milk and separating the cream therefrom; and its objects are to provide simple means for subjecting milk contained therein to the influence of cold by means of water continuously supplied to the apparatus, or with a supply of ice, whereby the temperature of the water surrounding the milk-receptacles shall be most evenly distributed and applied against the body of the milk, and also to provide means therewith to ascertain the amount or thickness of the layer of cream in each milk-receptacle. Other objects will appear in the following description of my invention, and its novel features will be specifically set forth in the claims.

Figure 1:
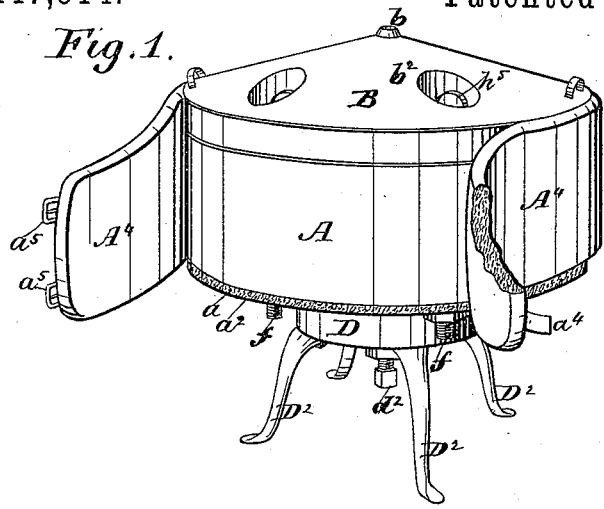
Figure 2:
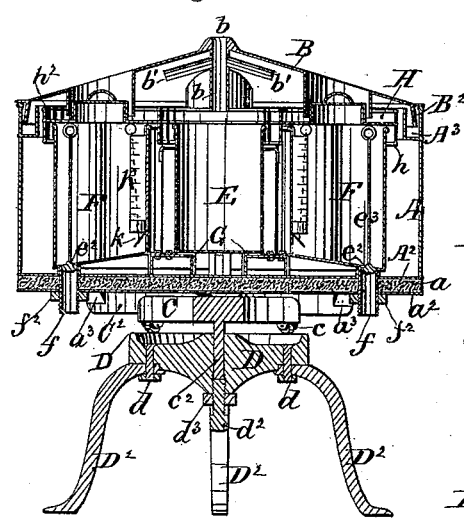
Figure 3:
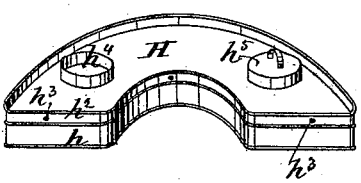
Figures 4, 5:
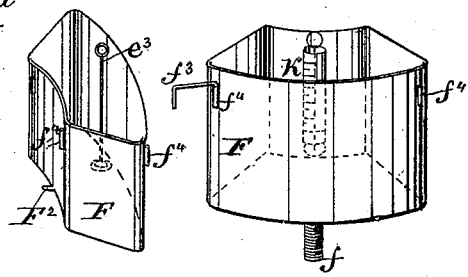
Figure 11:
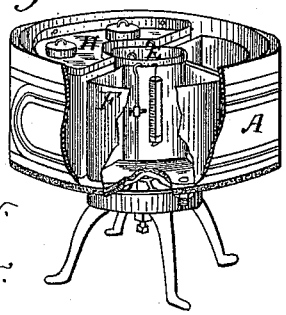
Figure 6:
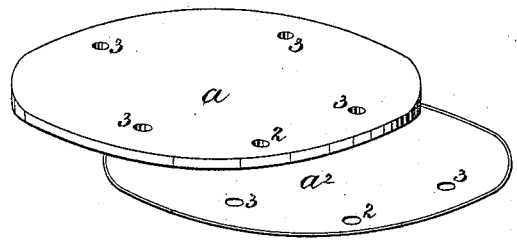
Figure 7:
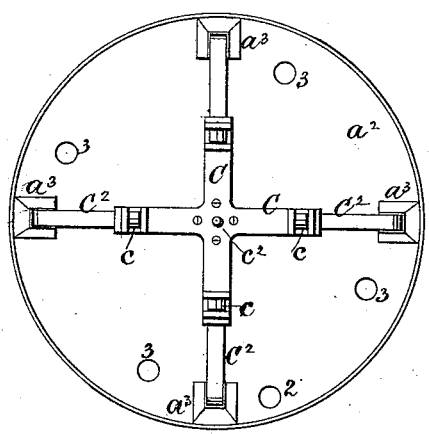
Figure 8:
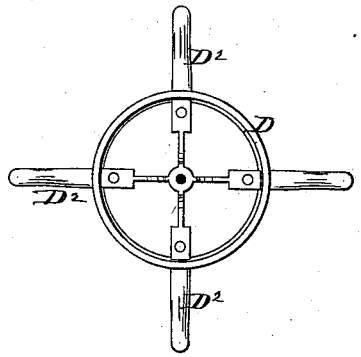
Figure 9:
Figure 10:
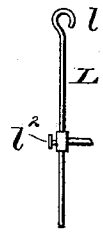

In the accompanying drawings, Figure 1 is a perspective view of the creamer, showing the non-conducting envelope partly removed. Fig. 2 is a vertical section of the creamer constructed in accordance with my invention. Fig. 3 is a perspective view of the cover for two of the milk-receptacles. Fig. 4 is a side perspective view of one of the milk-receptacles. Fig. 5 is a front perspective view of said milk-receptacle with a cream-tester therein. Fig. 6 is a perspective view of a disk of felt and one of sheet metal to be secured to the bottom of the creamer. Fig. 7 is a bottom view of the creamer, showing the bearing-rollers thereof. Fig. 8 is a top view of the supporting-legs and track for the rollers. Fig. 9 is vertical section of a portion of one of the milk-receptacles with the cream-tester attached thereto. Fig. 10 is a side view of the cream-gage; and Fig. 11 is a perspective view of the creamer with its cover removed, two of the milk-receptacles closed and two open, one of them having one of its sides broken away to show its interior and the cream-tester and the cream-gage therein.

In said drawings, A represents the cylindrical shell of the creamer, $A^2$ the bottom, and $A^3$ an internal channel adjacent to the top of said shell to receive the flange $B^2$ of the cover B. To protect the creamer against change of temperature of the atmosphere, it is made to rest upon a disk $a$, of felt, which is evenly supported by a sheet-metal disk $a^2$, and the latter, with the creamer thereon, is carried by the four arms of the frame C. Said arms are hollow and each one carries an extension $C^2$, the outer end of which is received in a socket $a^3$, projecting from the bottom of the disks $a^2$, said socket $a^3$ being to retain the outer ends of the extensions $C^2$. Each arm of the frame C has projecting from its bottom a roller $c$ to steady it and adapted to travel upon the upwardly-projecting rim of a platform D, which has legs $D^2$ secured thereto by bolts $d$. This platform has a central vertical perforation to receive the spindle $c^2$, pendent from the frame C. The lower end of said spindle rests upon the ends of a screw $d^2$, adjustably retained in the central perforation of the platform, and said screw supports the spindle and is secured in position by a jam-nut $d^3$ thereon. The sides of the creamer are also protected against change of temperature by a broad belt $A^4$, of covered felt, provided with straps $a^4$ and buckets $a^5$, by which it can be promptly attached around the creamer.

Centrally within the creamer is placed the ice-chamber or refrigerator E, and around it are placed the segmental milk-receptacles F, the bottom of each of which is inclined down toward its outward side, where said bottom is provided with an outlet-pipe $f$, through which the milk contained therein can be discharged when the valve $e^2$, inserted in said pipe, is lifted by means of the long stem $e^3$. The pipes $f$ are also used to secure the milk-receptacles to the bottom of the creamer by means of nuts $f^2$, engaging with the screw-threaded surface of said pipes and clamping the felt disk $a$ against the bottom of the creamer.

The higher portion of each of the inclined milk-receptacles is provided with a lug $F^2$, Fig. 4, adapted to rest upon and engage with the top of a skeleton bridge G, upon which the ice-chamber E also rests. The milk-receptacles are kept at suitable distances apart to form passages for the circulation of water around them by angular wire cramps $f^3$, entering sockets $f^4$, secured to the sides of said receptacles. Each pair of receptacles is closed by means of a cover H, resting upon their edges, said cover having a pendent flange $h$ to inclose said edges and an upturned flange $h^2$ to retain a layer of water upon said cover, but as a thin layer only is required the flange $h^2$ has perforations $h^3$ below its top for the escape of water before it reaches said top. Each cover H has a perforation $h^4$ over each milk-receptacle, through which the stem $e^3$ of the bottom valve $e^2$ can be lifted without lifting said cover, and each perforation $h^4$ has an upwardly-projecting flange to prevent the entrance of any of the water lying upon the cover. Each perforation $h^4$ is provided with a cap-cover $h^5$ to prevent the entrance of air when it is desired to keep the receptacles closed. The cover B has cylindrical openings $b^2$ therein, corresponding in location with the cap-covers $h^5$, through which the latter can be removed without lifting the cover B. Said cover B has also in its center a pendent tube $b$, through which a stream of water can be conducted into the chamber E or into the space shown between the receptacles, and thence around the milk-receptacles. The tube $b$ has also two lateral inclined branch tubes $b'$, through which a portion of the stream of water is directed on top of the covers H of the milk-receptacles. When ice is used in the chamber E, a stopper is inserted in the tube $b$ until it is forced below said branches, so that whatever amount of water is introduced in the apparatus is directed on top of the covers H, and thence through the perforations $h^3$ it flows around the milk-receptacles in the creamer, and thence it is removed through a tube passing through the perforations 2 (shown in Fig. 6) in the disks $a$ and $a^2$, while the pipes $f$ of the milk-receptacles pass through the perforations 3. (Shown in said figure.)

To ascertain the amount of cream, each milk-receptacle is provided with a cream-tester consisting of a glass tube K, having a scale marked thereon. Said tube is retained in a sheet-metal frame that is removably hooked at the top to a socket on the inside of the milk-receptacle and has at the bottom a hinged valve $k$, that is controlled by a valve-rod $k^2$, upon which there is a bend or lateral projection $k^3$, adapted to rest upon the top edge of the test-tube and retain the valve closed, so that the test-tube can be lifted out of the milk and cream in the milk-receptacle and its contents examined and measured; but when the test-tube is first introduced into the milk the bottom is left open, so that the milk can enter in at that point. After the depth of cream has been ascertained the gage L, Fig. 10, is used to regulate the skimming. Said gage consists of a wire having a hook $l$ at its upper end, adapted to rest upon the edge of the milk-receptacle, the lower end of said wire extending to the bottom of said receptacle. The gage carries a button or pointer $l^2$, that clasps the wire, but is adapted to be moved and set at any desired point thereon, so that after the amount of milk to be drawn out of the receptacle from under the cream has been ascertained by the cream-tester the pointer is set at that height and the gage hung to the edge of the receptacle, and the milk is withdrawn until the pointer appears upon the surface of the cream, when the bottom tube $f$ is closed with a stopper to stop the flow of milk, after which the stopper can be removed and the cream be drawn in another pail or vessel.

Having now fully described my invention, I claim—

1. The combination of a cylindrical shell, a felt disk under said shell, and a sheet-metal disk under said felt disk, a series of segmental milk-receptacles within said shell, each receptacle provided with a screw-threaded outlet-pipe passing through said disks, and nuts upon said pipes securing said disks to the bottom of the shell, substantially as described.

2. The combination of a cylindrical shell, a felt disk, and a sheet-metal disk, the latter having sockets $a^3$, with a series of segmental milk-receptacles within said shell and having attached thereto screw-threaded outlet-pipes and nuts thereon uniting said shell and disks, the pivoted frame C, having rollers $c$ and extension-arms entering said sockets, with a platform D, mounted upon legs and having a circular track for said rollers, substantially as described.

3. The combination of a cylindrical shell, a disk attached thereto and having sockets adjacent to its periphery, a revoluble frame C, having rollers $c$, extension-arms $C^2$, and a spindle $c^2$, with a platform having a central perforation and an adjustable screw under said spindle, substantially as described.

4. The combination of a cylindrical shell, a series of segmental milk-receptacles having inclined bottoms, screw-threaded outlet-pipes attached thereto with nuts thereon and thereby secured to said shell, a central bridge under the highest portion of said inclined bottoms, and a central chamber E, resting upon said bridge, substantially as described.

In testimony whereof I affix my signature in presence of two witnesses.

JULIUS G. SMITH.

Witnesses:
ALBERT P. CARPENTER,
FRED. S. TOBEY.